(12) United States Patent
Ellsworth

(10) Patent No.: US 11,312,498 B2
(45) Date of Patent: Apr. 26, 2022

(54) CONVERTIBLE ARMREST DISPOSED BETWEEN ADJACENT SEATS

(71) Applicant: The Boeing Company, Chicago, IL (US)

(72) Inventor: Joseph Z. Ellsworth, Kent, WA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 16/818,997

(22) Filed: Mar. 13, 2020

(65) Prior Publication Data

US 2021/0284341 A1 Sep. 16, 2021

(51) Int. Cl.
*B64D 11/06* (2006.01)

(52) U.S. Cl.
CPC .................. *B64D 11/0644* (2014.12)

(58) Field of Classification Search
CPC .......................... B64D 11/06; B64D 11/0644
See application file for complete search history.

(56) References Cited

U.S. PATENT DOCUMENTS

| 9,630,720 B2 * | 4/2017 | Saint-Jaimes ...... B64D 11/0644 |
| 10,953,777 B1 * | 3/2021 | Rathore .................. A47C 7/543 |
| 2014/0217798 A1 * | 8/2014 | Negusse ............ B64D 11/0646 |
| | | 297/411.3 |

FOREIGN PATENT DOCUMENTS

| CN | 108501783 A | * | 9/2018 | |
| CN | 208325058 U | * | 1/2019 | |
| EP | 3100952 A1 | * | 12/2016 | ......... B64D 11/0644 |
| WO | WO-2015149120 A1 | * | 10/2015 | ........... A47C 1/0308 |

* cited by examiner

*Primary Examiner* — Justin M Benedik
(74) *Attorney, Agent, or Firm* — Duft & Bornsen, PC

(57) ABSTRACT

Convertible armrests and seat assemblies that utilize convertible armrests. In one embodiment, a convertible armrest includes an armrest body connected to a seat frame between adjacent seats, a first arm pad coupled to the armrest body, and a second arm pad coupled to the armrest body. In a contracted configuration, the first arm pad and the second arm pad are stacked. In an expanded configuration, the first arm pad and the second arm pad are disposed side-by-side.

20 Claims, 11 Drawing Sheets

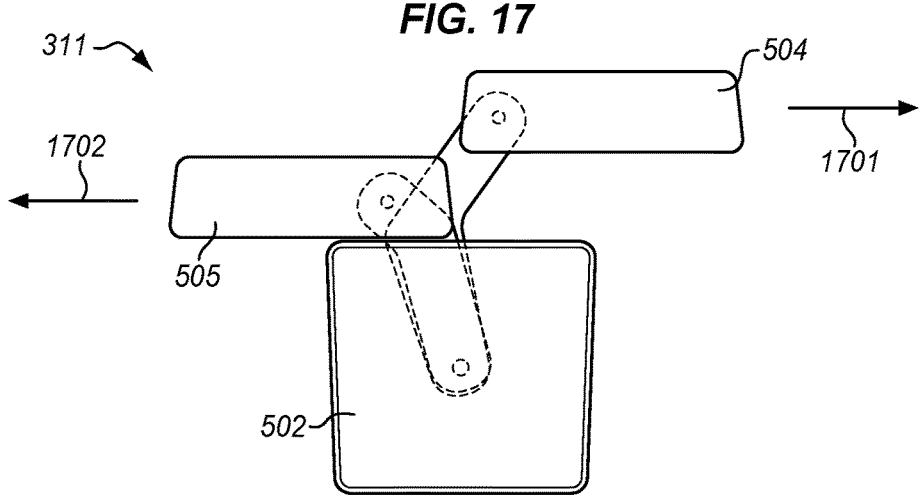
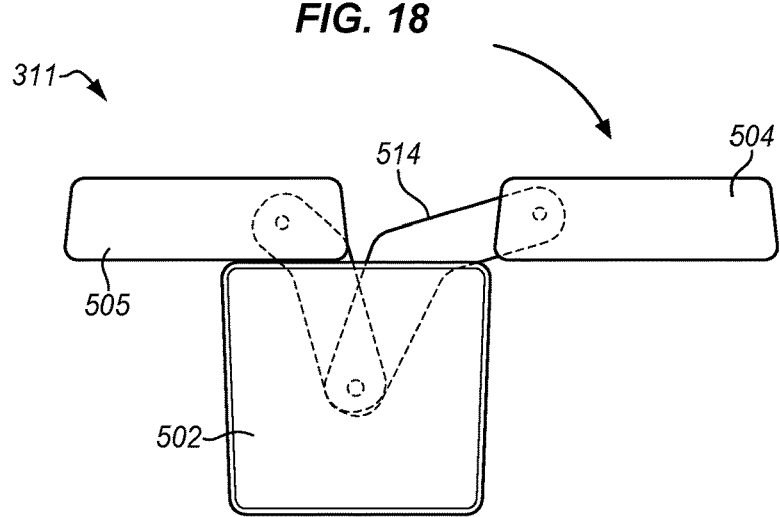
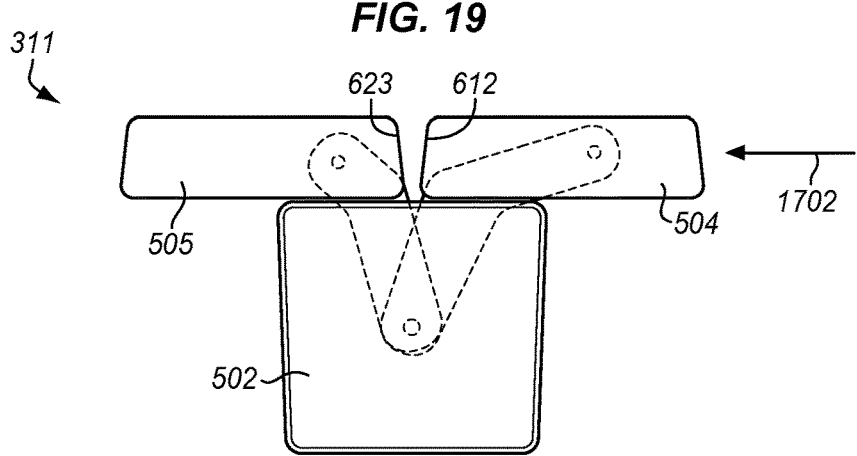

CONVERTIBLE ARMREST DISPOSED BETWEEN ADJACENT SEATS

FIELD

This disclosure relates to the field of seats, and more particularly, to armrests between adjacent seats on an aircraft or another type of vehicle having a passenger seating area.

BACKGROUND

The passenger seating area on aircraft, boats, trains, passenger vehicles, etc., typically includes a number of seats arranged in rows, with one or more aisles between the rows. For example, an aircraft may have a 3+3 layout with three seats abreast on each side of an aisle. Groups of two, three, or more seats are commonly connected together side-by-side in seat assemblies that are attached to a seat track or directly to the floor. With this arrangement, two adjacent seats may share a common armrest, which is referred to as a middle or intermediate armrest. Passengers sitting in these two adjacent seats may feel uncomfortable in sharing the middle armrest.

SUMMARY

Provided herein is a convertible armrest that has a narrower width in one configuration, and a larger width in another configuration. In general, the convertible armrest includes a pair of arm pads that may be manually manipulated by a passenger. In a contracted configuration, one arm pad is positioned on top of the other arm pad so that the convertible armrest has a narrower width. When converted to an expanded configuration, the arm pads are disposed adjacent to one another so that the convertible armrest becomes wider. This provides a larger surface area on the armrest to share by passengers sitting in adjacent seats.

One embodiment comprises a convertible armrest that includes an armrest body connected to a seat frame between adjacent seats, a first arm pad coupled to the armrest body, and a second arm pad coupled to the armrest body. In a contracted configuration, the first arm pad and the second arm pad are stacked. In an expanded configuration, the first arm pad and the second arm pad are disposed side-by-side.

In another embodiment, the convertible armrest further includes a first linkage pivotally coupled to the armrest body, and slidably and pivotally coupled to the first arm pad. The convertible armrest further includes a second linkage pivotally coupled to the armrest body, and slidably coupled to the second arm pad.

In another embodiment, the first arm pad has a coupling portion that includes a slot disposed along at least a portion of a width of the first arm pad. An end of the first linkage connects to the coupling portion with a retainer disposed through the slot.

In another embodiment, the convertible armrest further includes a locking mechanism that holds the first arm pad in place in the contracted configuration. The locking mechanism comprising a detent that projects from a side of the first linkage, and a detent channel disposed toward an end of the slot that engages the detent on the first linkage.

In another embodiment, the second arm pad has a coupling portion that includes a slot disposed along at least a portion of a width of the second arm pad. An end of the second linkage connects to the coupling portion with a retainer disposed through the slot.

In another embodiment, the first arm pad and the second arm pad are disposed equidistant to a vertical centerline of the armrest body in the expanded configuration.

In another embodiment, a top surface of the first arm pad is co-planar with a top surface of the second arm pad in the expanded configuration.

In another embodiment, a top surface of the first arm pad is elevated in relation to a top surface of the second arm pad in the expanded configuration, or vice-versa.

In another embodiment, the armrest body includes a cavity that houses the second arm pad in the contracted configuration.

In another embodiment, sides of the first arm pad and sides of the second arm pad are beveled.

In another embodiment, a thickness of the first arm pad is substantially similar to a thickness of the second arm pad.

In another embodiment, the convertible armrest is installed in a seat assembly of an aircraft.

Another embodiment comprises a seat assembly that includes a plurality of seats abreast, and an intermediate armrest between a pair of the seats that provides a resting surface configured to expand in width. The intermediate armrest includes a first arm pad and a second arm pad. In a first configuration, a first width of the resting surface is defined by a top surface of the first arm pad. In a second configuration, a second width of the resting surface is defined by a combination of the top surface of the first arm pad and a top surface of the second arm pad.

In another embodiment, the first arm pad and the second arm pad are stacked in the first configuration, and the first arm pad is positioned alongside the second arm pad in the second configuration.

In another embodiment, the top surface of the first arm pad is co-planar with the top surface of the second arm pad in the second configuration.

In another embodiment, the top surface of the first arm pad is elevated in relation to the top surface of the second arm pad in the second configuration, or vice-versa.

In another embodiment, the intermediate armrest is configured to pivot between seat backs of the pair of the seats, and the first width of the resting surface is constrained by a distance between the seat backs.

In another embodiment, the seat assembly is installed in an aircraft.

Another embodiment comprises a method of converting a middle armrest. The method comprises providing the middle armrest between adjacent seats, where the middle armrest includes a first arm pad disposed on top of a second arm pad in a contracted configuration so that a resting surface of the middle armrest has a first width defined by a top surface of the first arm pad. The method further comprises laterally shifting the first arm pad in a first direction, laterally shifting the second arm pad in a second direction opposite the first direction, lowering the first arm pad in relation to the second arm pad, and adjusting at least one of the first arm pad and the second arm pad to be adjacent so that the resting surface of the middle armrest has a second width defined by a combination of the top surface of the first arm pad and a top surface of the second arm pad.

In another embodiment, the method further comprises laterally shifting the first arm pad in the first direction, raising the first arm pad in relation to the second arm pad, laterally shifting the second arm pad in the first direction, and laterally shifting the first arm pad in the second direction to be disposed on top of the second arm pad in the contracted configuration so that the resting surface of the middle armrest has the first width defined by the top surface of the first arm pad.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIGS. 17-22 are front views of a middle armrest showing movements of arm pads according to the method of FIG. 16.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
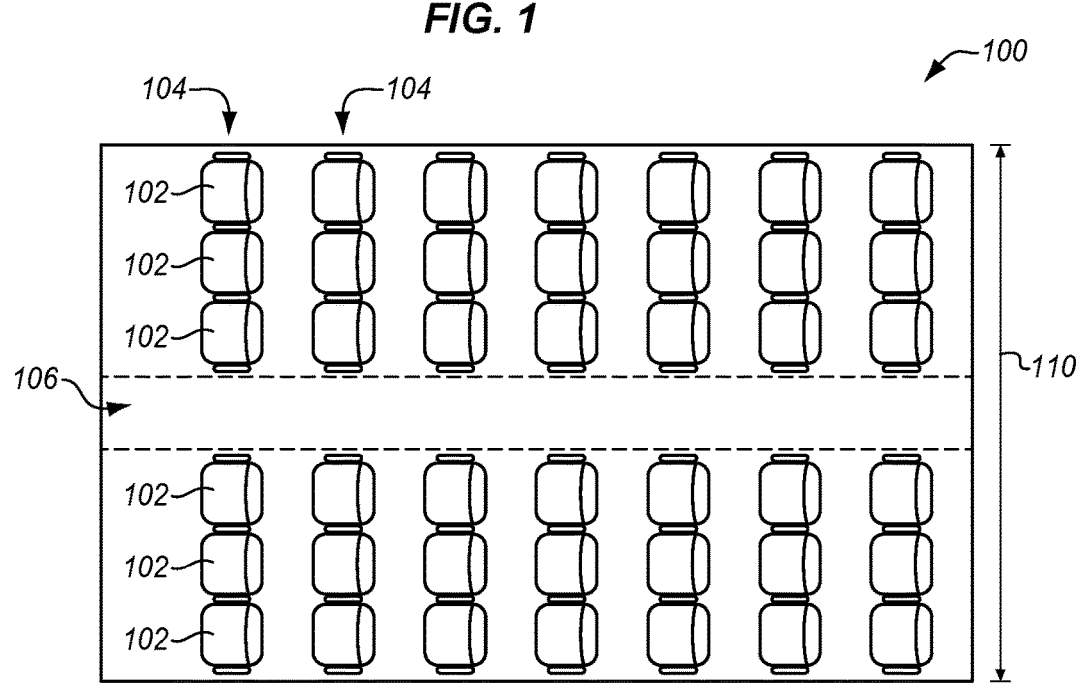
FIG. 1 is a plan view of a passenger seating area.
Figure 2:
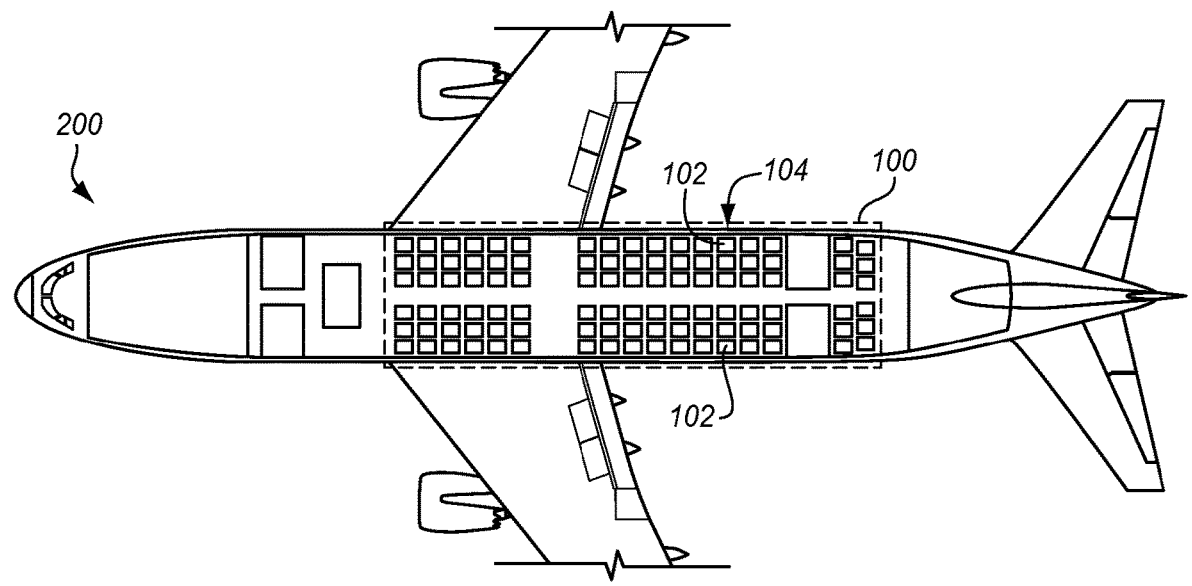
FIG. 2 illustrates a passenger seating area in an aircraft.

FIG. 1 is a plan view of a passenger seating area 100. Passenger seating area 100 includes a plurality of seats 102 (also referred to as passenger seats) that are arranged in rows 104 along a width 110 of the passenger seating area 100. An aisle 106 is shown as separating rows 104 along width 110. Seats 102 are typically arranged in this or a similar manner to maximize the capacity of passenger seating area 100. Passenger seating area 100 may be for an aircraft, a boat, a train, a passenger vehicle (e.g., bus), etc. For example, FIG. 2 illustrates passenger seating area 100 in an aircraft 200. Passenger seating area 100 in aircraft 200 has seats 102 that are arranged in rows 104, much like in FIG. 1. Although three seats 102 are illustrated on each side of aisle 106 (for a 3+3 layout), passenger seating area 100 may have another number of seats 102 in a row 104, and may have more aisles 106 than is illustrated. For example, passenger seating area 100 may have a 1+2 layout, a 2+2 layout, a 3+3+3 layout, a 2+5+2 layout, etc.

Figure 3:
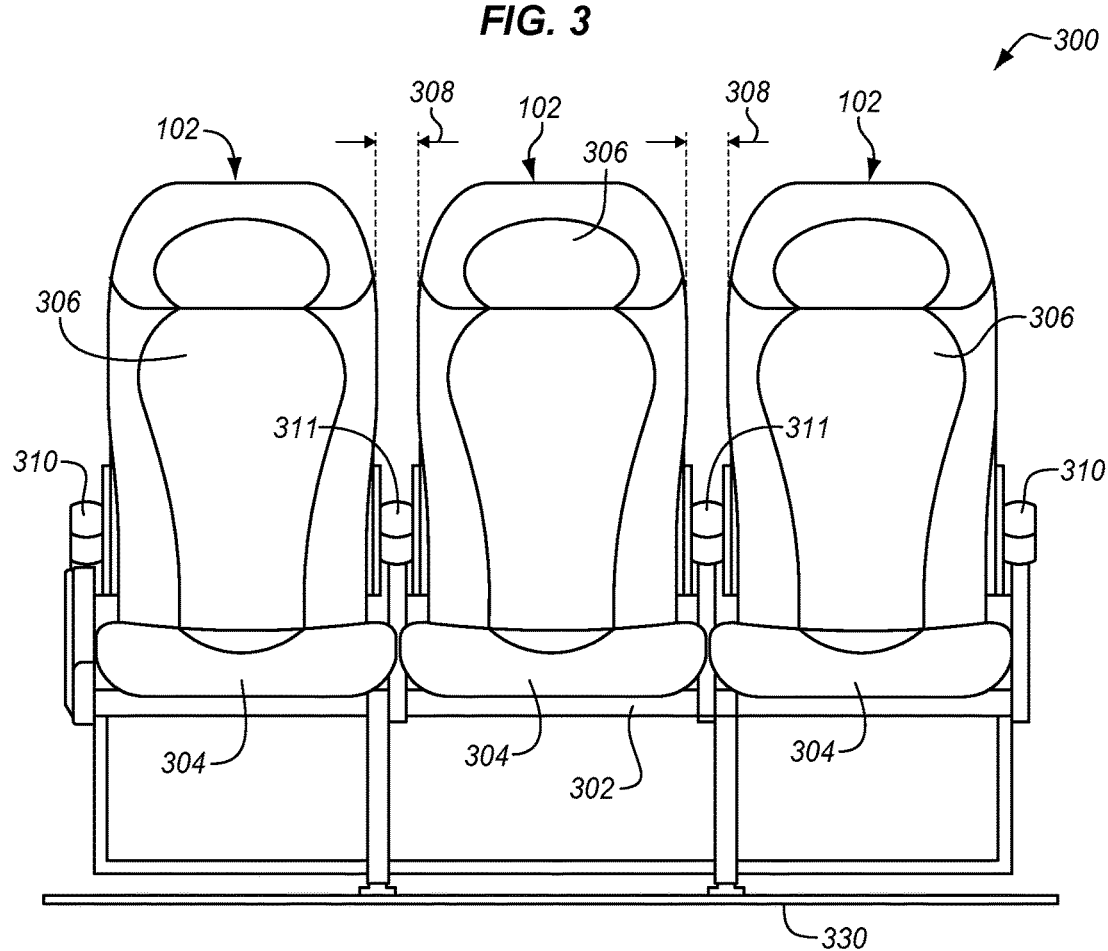
FIG. 3 is a front view of a seat assembly in an illustrative embodiment.

Seats 102 on each side of aisle 106 may be configured in seat assemblies. FIG. 3 is a front view of a seat assembly 300 in an illustrative embodiment. A seat assembly 300 is a group of seats 102 abreast (i.e., side-by-side and facing the same way), and may be installed in an aircraft 200 as shown in FIG. 2. Generally, seat assembly 300 includes a seat frame 302 attached to the floor 330 of a passenger seating area 100. Seat assembly 300 also includes a seat cushion 304 and a seat back 306 for each of the seats 102 that are attached to seat frame 302. The seat backs 306 of adjacent seats 102 are separated by a distance 308. Although three seats 102 are shown in FIG. 3, seat assembly 300 may include more or less seats 102 as desired.

Seat assembly 300 also includes a number of armrests 310-311. Armrests 310 that are disposed on the ends of seat assembly 300 are referred to as "end" armrests. The end armrests 310 may be positioned next to an aisle 106, next to a window, etc. Armrests 311 that are disposed between adjacent seats 102 are referred to as "middle" or "intermediate" armrests. Middle armrests 311 are shared by passengers in adjacent seats 102. A typical middle armrest in a passenger seating area 100 is narrow, which can make sharing of the armrest uncomfortable. In the embodiments described herein, a middle armrest 311 is able to transform from a single armrest to a larger armrest (e.g., a double armrest). One technical benefit is that the middle armrest 311 can be shared more easily by passengers in adjacent seats 102.

Figure 4:
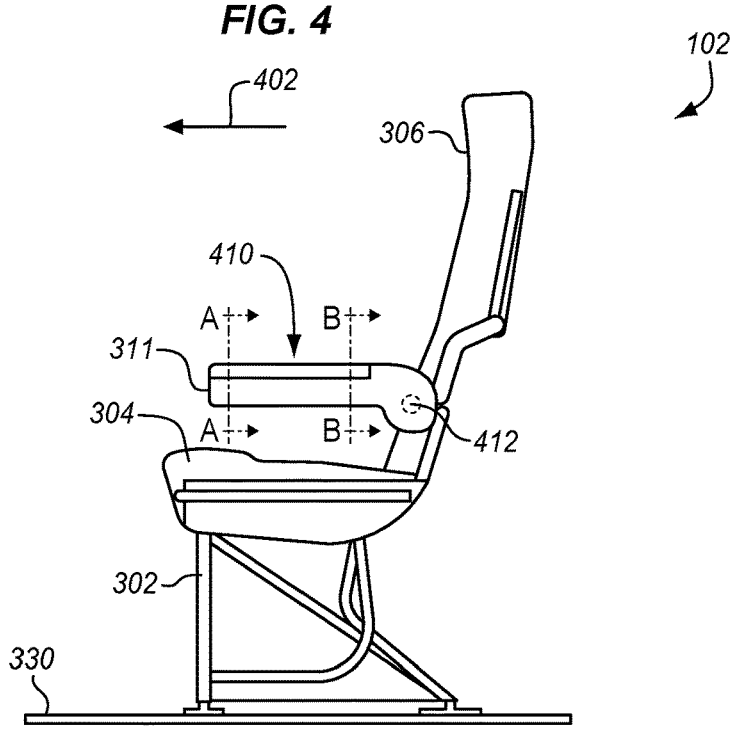
FIG. 4 is a side view of a seat and a middle armrest in an illustrative embodiment.

FIG. 4 is a side view of a seat 102 and a middle armrest 311 in an illustrative embodiment. In this embodiment, middle armrest 311 projects from between adjacent seats 102 generally in a seat facing direction 402. Middle armrest 311 has a resting surface 410 for a passenger to rest his/her arm, which is defined by one or more arm pads as will be described in more detail below. Resting surface 410 may be substantially horizontal as illustrated in FIG. 4, although resting surface 410 may be slightly inclined or declined in other embodiments. Middle armrest 311 may be a movable armrest that is configured to pivot about a pivot axis 412 between a lowered position (shown in FIG. 4) where the resting surface 410 is substantially horizontal, and a folded position where middle armrest 311 is disposed between the seat backs 306 of adjacent seats 102. Alternatively, middle armrest 311 may be an unmovable armrest that is fixedly attached to seat frame 302.

Figure 5:
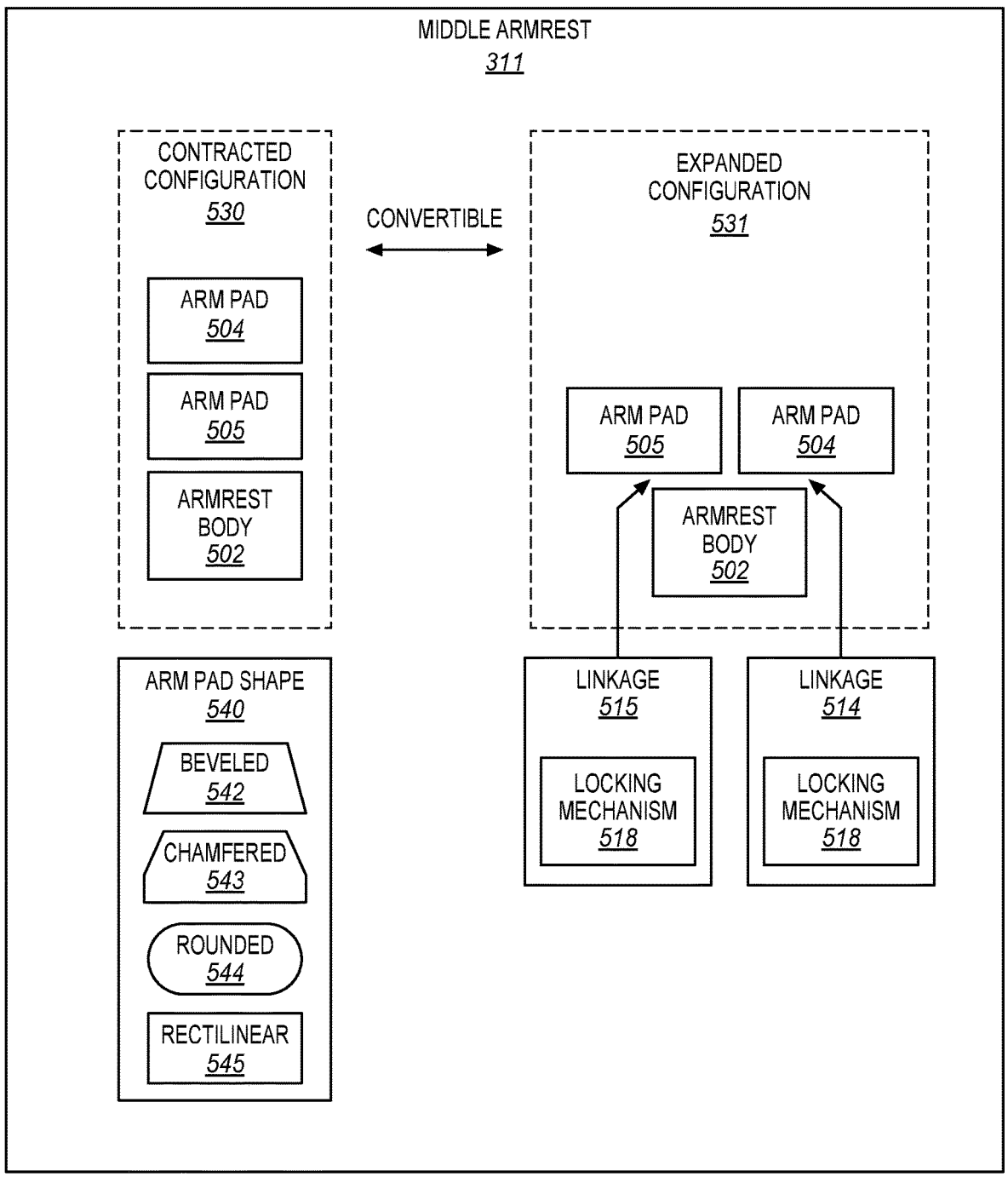
FIG. 5 is a schematic diagram of a middle armrest in an illustrative embodiment.

FIG. 5 is a schematic diagram of a middle armrest 311 in an illustrative embodiment. Middle armrest 311 includes an armrest body 502, and a plurality of arm pads 504-505. Armrest body 502 is the part of middle armrest 311 that attaches or connects to seat frame 302 between adjacent seats 102 (see FIG. 3), and provides the structural support for middle armrest 311. Armrest body 502 may be formed from a rigid material, such as plastic, a composite material, etc. An arm pad 504-505 is a part of middle armrest 311 where a passenger rests his/her arm. An arm pad 504-505 may be formed from a rigid material, such as plastic, a composite material, etc., a pliable material, such as rubber, a cushion-type material, such as foam, and/or another type of material that is suitable for a passenger.

Arm pads 504-505 of middle armrest 311 are convertible between a contracted configuration 530 and an expanded configuration 531 to change the width of middle armrest 311. Thus, middle armrest 311 may be considered a "convertible" armrest. In the contracted configuration 530, arm pads 504-505 may be stacked, which means that one arm pad 504 is positioned over or on top of the other arm pad 505. In the expanded configuration 531, arm pad 504 is positioned alongside arm pad 505. Thus, the width of middle armrest 311 is enlarged when in the expanded configuration 531.

As will be described in more detail below, arm pad 504 is mechanically coupled to armrest body 502 via a linkage 514, and arm pad 505 is mechanically coupled to armrest body 502 via a linkage 515. Linkages 514-515 are structural members that allow arm pads 504-505 to move in relation to armrest body 502 in a desired manner to transition between the contracted configuration 530 and the expanded configuration 531. For example, linkage 514 may be slidably coupled to arm pad 504, and pivotally coupled to armrest body 502. Similarly, linkage 515 may be slidably coupled to arm pad 505, and pivotally coupled to armrest body 502. Also, one or both of linkages 514-515 may include a locking mechanism 518 that secures or holds an arm pad 504-505 in place in the contracted configuration 530 and/or the expanded configuration 531.

Figure 6:
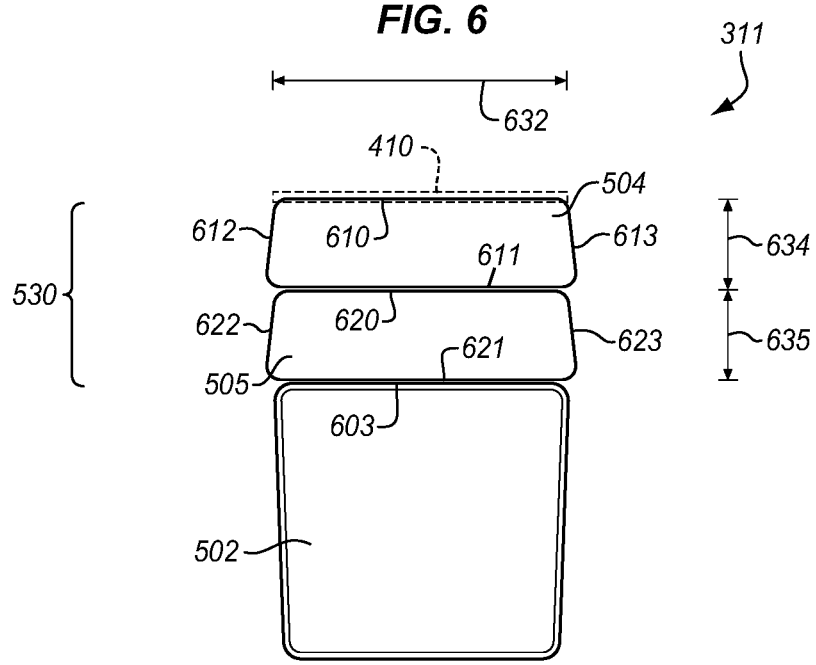
FIG. 6 is a front view of a middle armrest in a contracted configuration in an illustrative embodiment.
Figure 7:
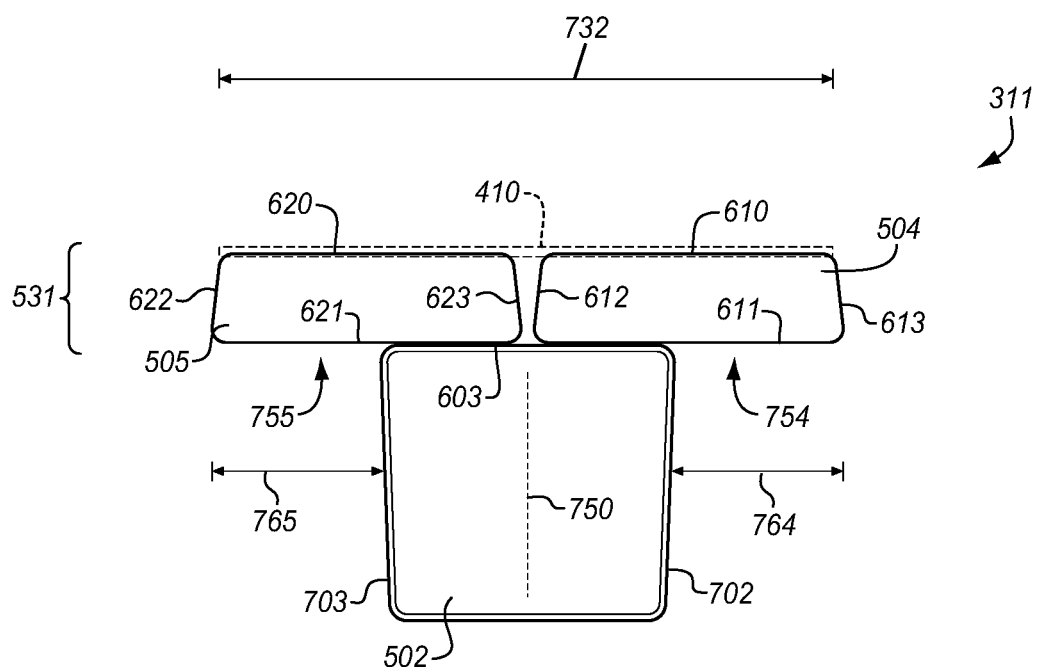
FIG. 7 is a front view of a middle armrest in an expanded configuration in an illustrative embodiment.

Further details of middle armrest 311 are provided below as an example. FIGS. 6-7 are front views of middle armrest 311 in an illustrative embodiment. FIG. 6 illustrates the contracted configuration 530. Middle armrest 311 includes armrest body 502 and arm pads 504-505. Arm pad 504 has a top surface 610, a bottom surface 611, and opposing sides 612-613. Likewise, arm pad 505 has a top surface 620, a bottom surface 621, and opposing sides 622-623. Arm pad 504 has a thickness 634, and arm pad 505 has a thickness 635. In the contracted configuration 530, arm pads 504-505 are positioned one on top of another. For example, arm pad 504 is disposed on top of arm pad 505 so that they are vertically stacked. When stacked in this manner, arm pads 504-505 may be generally parallel so that the top surface 610 of arm pad 504 is substantially horizontal. In this configuration, resting surface 410 of middle armrest 311 is defined by the top surface 610 of arm pad 504. Thus, the width 632 of resting surface 410 is defined by the width of the top surface 610 of arm pad 504. When middle armrest 311 is configured to pivot between the seat backs 306 of adjacent seats 102 (see FIG. 3), width 632 may be constrained by the distance 308 between the seat backs 306.

FIG. 7 illustrates the expanded configuration 531. In the expanded configuration 531, arm pads 504-505 are disposed side-by-side so that resting surface 410 is defined by a combination of the top surface 610 of arm pad 504 and the top surface 620 of arm pad 505. Thus, the width 732 of resting surface 410 is larger in the expanded configuration 531 than the width 632 of resting surface 410 in the contracted configuration 530. When arm pads 504-505 are positioned alongside one another, side 612 of arm pad 504 is adjacent or abutting side 623 of arm pad 505.

In one embodiment, arm pads 504-505 may be disposed equidistant to a vertical centerline 750 of armrest body 502. Depending on the width of armrest body 502, arm pad 504 may have an overhang portion 754 that extends laterally outward past a side 702 of armrest body 502, and arm pad 505 may have an overhang portion 755 that extends laterally outward past a side 703 of armrest body 502. The width 764 of overhang portion 754 represents how much arm pad 504 encroaches into one adjacent seat 102, and the width 765 of overhang portion 755 represents how much arm pad 505 encroaches into the other adjacent seat 102. It may be desirable for the width 764 of overhang portion 754 to be substantially equal to the width 765 of overhang portion 755 so that the amount of encroachment by arm pads 504-505 is about the same.

Figure 8:
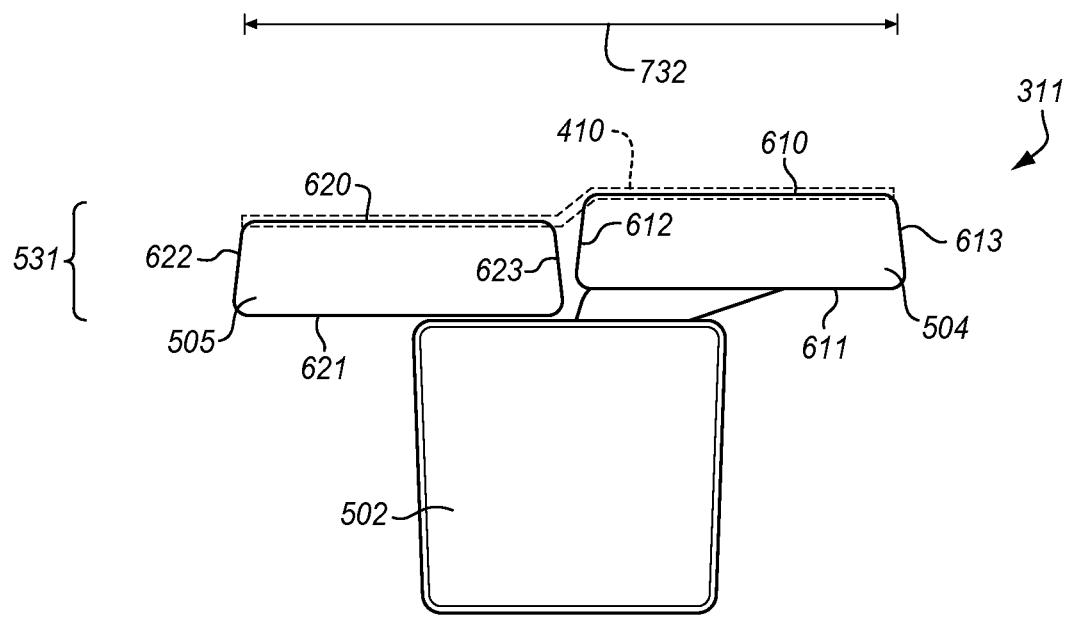
FIGS. 8-9 are front views of a middle armrest with arm pads on different planes in an illustrative embodiment.
Figure 9:
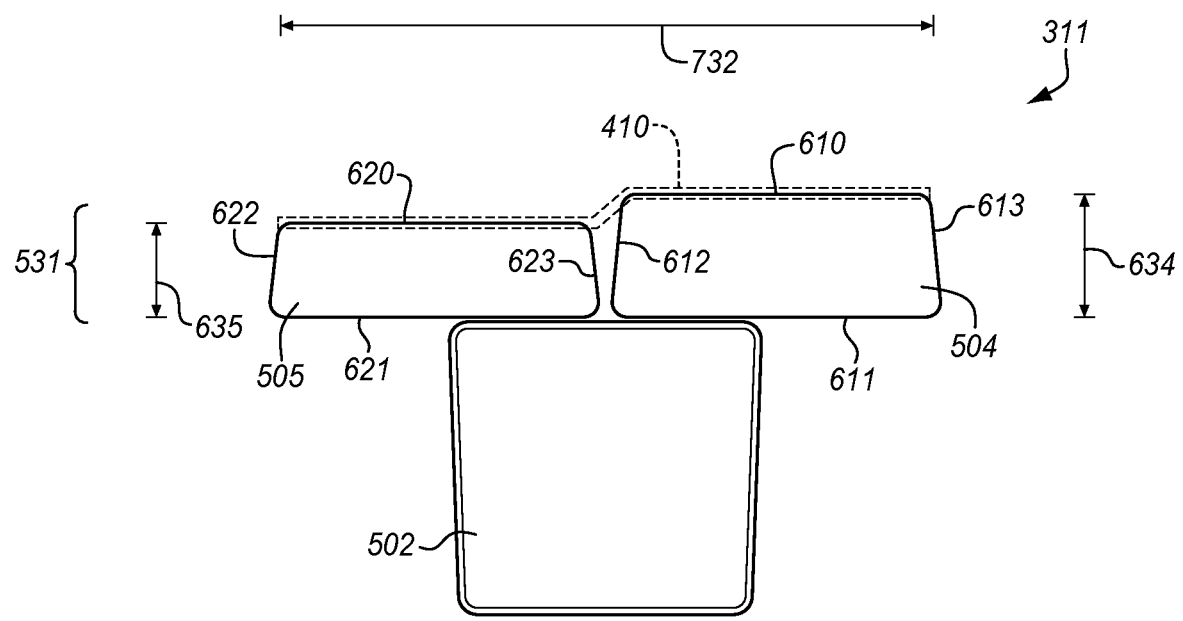

In the embodiment shown in FIG. 7, the top surface 610 of arm pad 504 may be co-planar with the top surface 620 of arm pad 505, which has the benefit of making resting surface 410 generally flat. For example, the thickness 634 of arm pad 504 may be substantially similar to the thickness 635 of arm pad 505 to make the top surfaces 610/620 coplanar. In another embodiment, the top surface 610 of arm pad 504 may be elevated in relation to the top surface 620 of arm pad 505 (or vice-versa). As shown in FIG. 8, arm pad 504 may be configured so that its top surface 610 is on a different or distinct plane that is elevated in relation to the top surface 620 of arm pad 505. As shown in FIG. 9, the thickness 634 of arm pad 504 may be greater than the thickness 635 of arm pad 505 (or vice-versa) to put the top surfaces 610/620 on distinct planes. Having the top surface 610 of arm pad 504 on a different plane than the top surface 620 of arm pad 505 has the benefit of creating a boundary or divider on resting surface 410.

Figure 10:
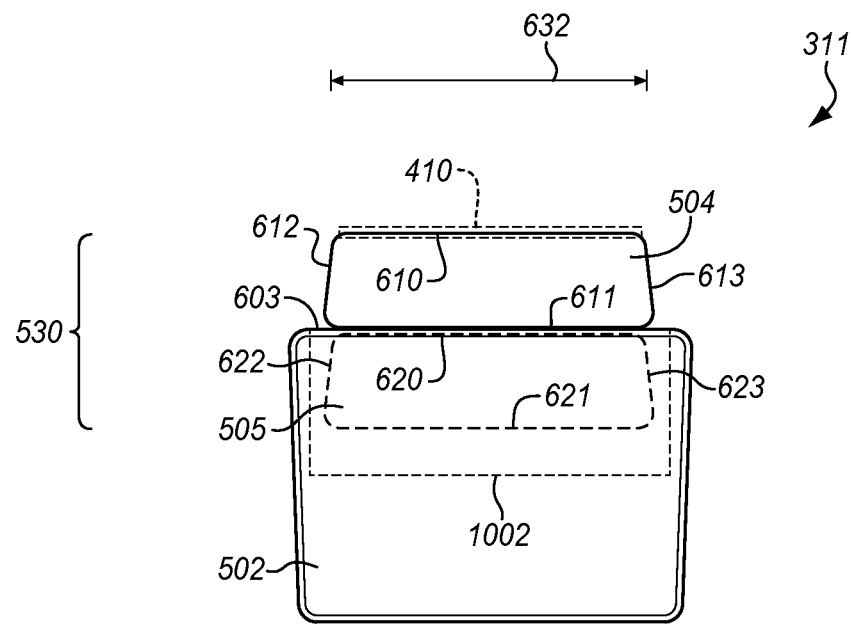
FIG. 10 is a front view of middle armrest with an arm pad contained in a cavity in an illustrative embodiment.

In FIG. 6, arm pads 504-505 are shown as disposed on or above the top surface 603 of armrest body 502. For example, arm pad 505 may rest on the top surface 603 of armrest body 502, and arm pad 504 may rest on arm pad 505. However, in other embodiments, arm pad 505 may be partially or fully contained in armrest body 502 when in the contracted configuration 530 as shown in FIG. 10. Armrest body 502 may include a cavity 1002, pocket, or empty space that houses arm pad 505 in the contracted configuration 530. Although arm pads 504-505 are shown as being generally parallel in the contracted configuration 530, it is noted that arm pad 505 may be oriented in other ways when housed within cavity 1002. In yet another embodiment, at least a portion of arm pad 504 may be housed within cavity 1002 when in the contracted configuration 530, with the top surface 610 of arm pad 504 projecting above the top surface 603 of armrest body 502 or being generally flush with the top surface 603 of armrest body 502.

In FIGS. 6-7, sides 612-613/622-623 of arm pads 504-505 are shown as being beveled. However, arm pads 504-505 may have other desired shapes for comfort or to aid in converting between the contracted configuration 530 and the expanded configuration 531. As shown in FIG. 5, the arm pad shape 540 may be selected as desired. One or both sides 612-613 of arm pad 504 and/or one or both sides 622-623 of arm pad 505 may be beveled 542 (as shown in FIG. 6), chamfered 543, rounded 544, rectilinear 545, or may have other shapes.

Figure 11:
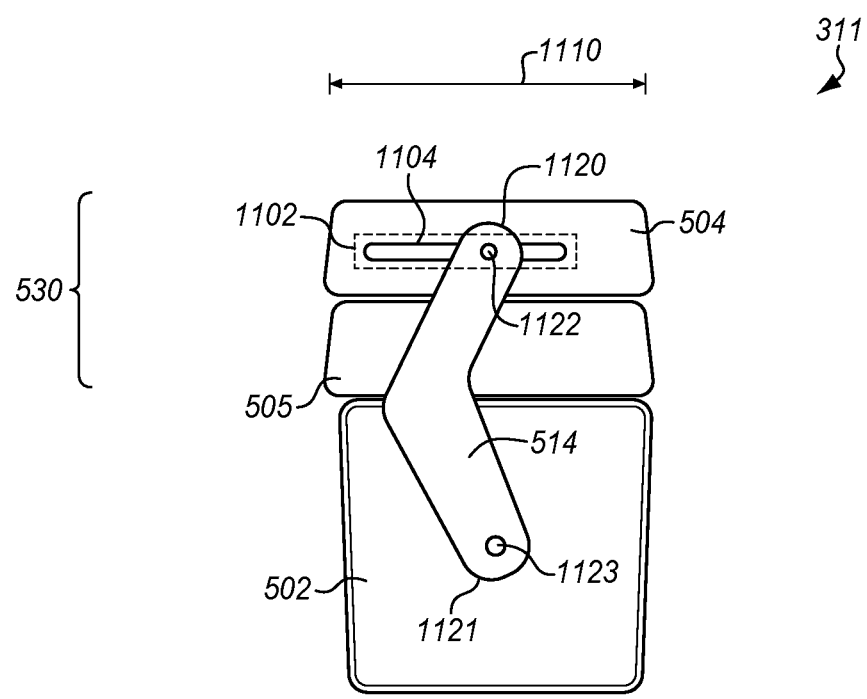
FIGS. 11-14 illustrate examples of linkages used to connect arm pads to an armrest body in an illustrative embodiment.
Figure 12:
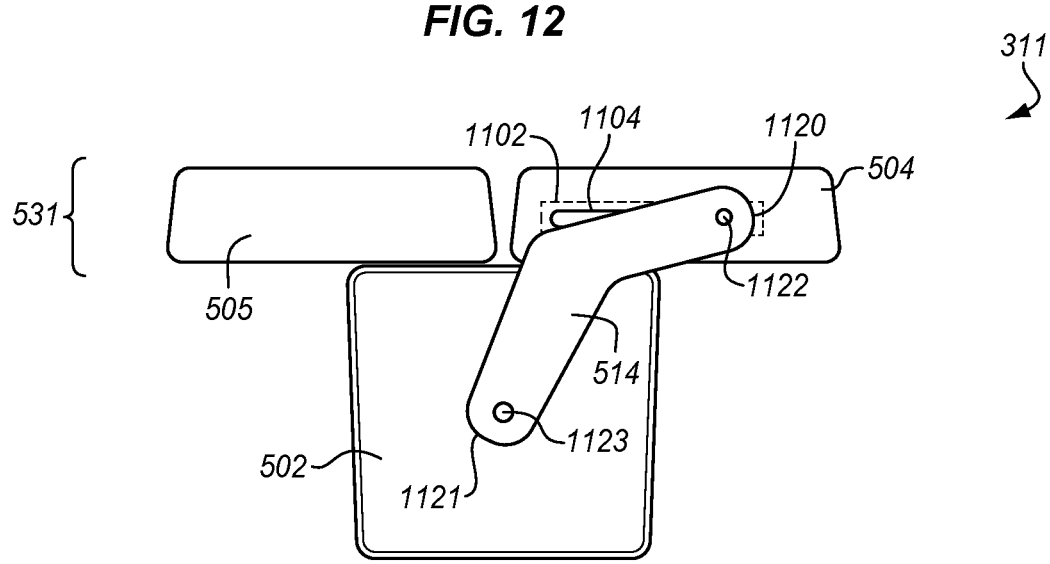

FIGS. 11-14 illustrate examples of linkages 514-515 used to connect arm pads 504-505 to armrest body 502 to allow for transformation between the contracted configuration 530 and the expanded configuration 531. FIG. 11 is a cross-sectional view of middle armrest 311 along cut plane A-A in FIG. 4, which shows linkage 514 for arm pad 504. Arm pad 504 has a coupling portion 1102 that includes a slot 1104 disposed along at least a portion of the width 1110 of arm pad 504. Slot 1104 may be generally horizontal, or may be angled along width 1110. One end 1120 of linkage 514 connects to coupling portion 1102 of arm pad 504 with a retainer 1122, such as a pin, a bolt, or another type of fastener, that is disposed through slot 1104. In this embodiment, retainer 1122 is able to slide and/or pivot within slot 1104. Thus, linkage 514 may be slidably and/or pivotally coupled to arm pad 504. The other end 1121 of linkage 514 is pivotally coupled to armrest body 502 with a retainer 1123. The design of linkage 514 is provided as an example, and other designs for linkage 514 are considered herein. FIG. 12 is a cross-sectional view of middle armrest 311 in the expanded configuration 531. In this view, linkage 514 is pivoted (e.g., clockwise) in relation to armrest body 502, which acts to shift arm pad 504 laterally and lower arm pad 504. Arm pad 504 may also be slid and pivoted in relation to linkage 514 via retainer 1122 to position arm pad 504 in this manner.

Figure 13:
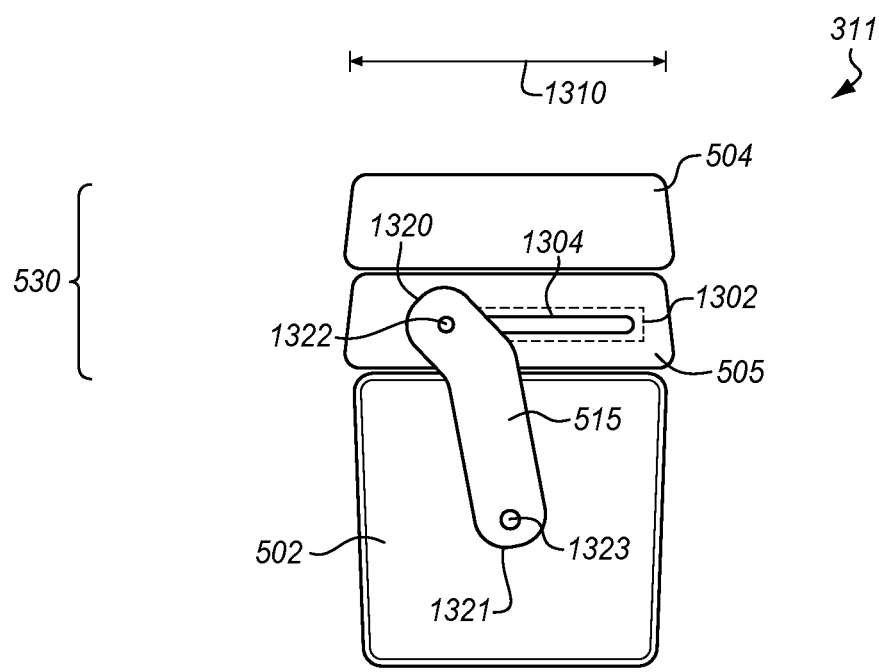
Figure 14:
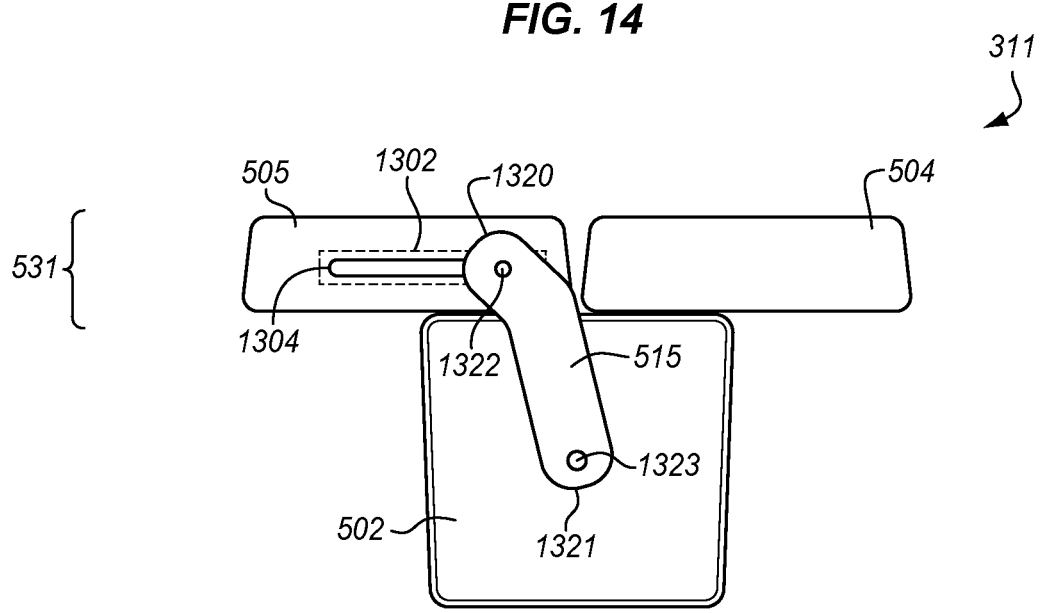

FIG. 13 is a cross-sectional view of along cut plane B-B in FIG. 4, which shows linkage 515 for arm pad 505. Arm pad 505 has a coupling portion 1302 that includes a slot 1304 disposed along at least a portion of the width 1310 of arm pad 505. It is noted that the width 1310 of arm pad 505 may correspond with the width 1110 of arm pad 504, or the widths 1110/1310 may be different. Slot 1304 may be generally horizontal, or may be angled along width 1310. One end 1320 of linkage 515 is coupled to arm pad 505 with a retainer 1322 that is disposed through slot 1304. In this embodiment, retainer 1322 is able to slide and/or pivot within slot 1304. Thus, linkage 515 may be slidably and/or pivotally coupled to arm pad 505. The other end 1321 of linkage 515 is pivotally coupled to armrest body 502 with a retainer 1323. The design of linkage 515 is provided as an example, and other designs for linkage 515 are considered herein. FIG. 14 is a cross-sectional view of middle armrest 311 in the expanded configuration 531. In this view, linkage 515 is pivoted (e.g., counter-clockwise) in relation to armrest body 502, which acts to shift arm pad 505 laterally. Arm pad 505 may also be slid and pivoted in relation to linkage 515 via retainer 1322 to position arm pad 505 in this manner.

Figure 15:
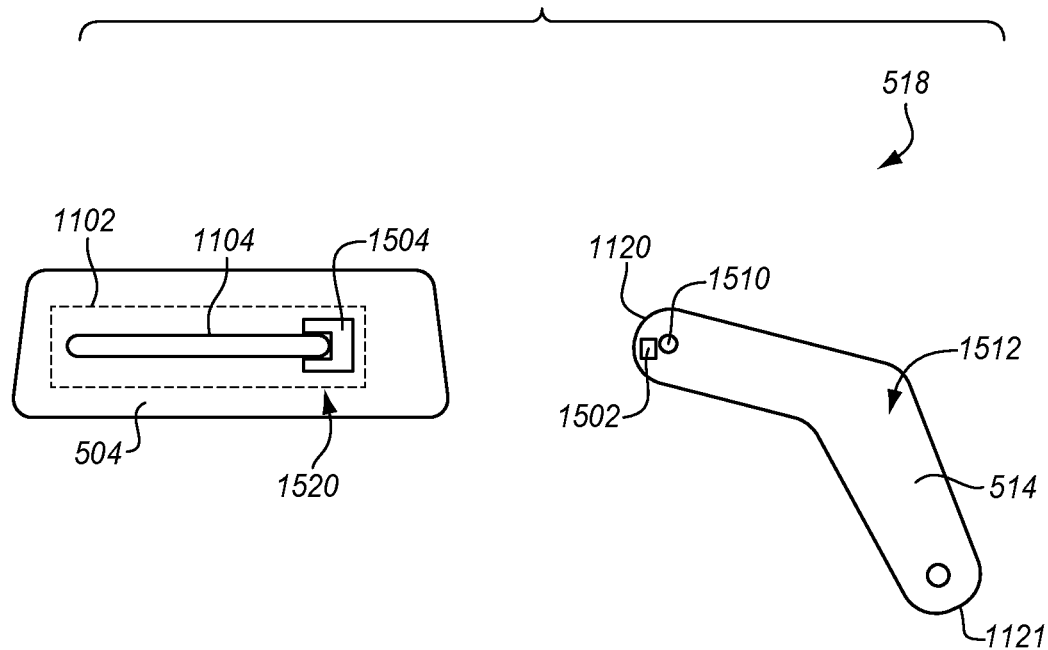
FIG. 15 shows an example of a locking mechanism for an arm pad in an illustrative embodiment.

FIG. 15 shows an example of locking mechanism 518 for arm pad 504 in an illustrative embodiment. In this embodiment, locking mechanism 518 is provided with a detent 1502 on linkage 514, and a detent channel 1504 on arm pad 504. End 1120 of linkage 514 includes a retainer hole 1510 for retainer 1122 (see FIG. 11), and also includes detent 1502 that projects from a side 1512 of linkage 514. Coupling portion 1102 of arm pad 504 further includes detent channel 1504 disposed at or toward one end 1520 of slot 1104. When linkage 514 is slid toward end 1520 of slot 1104, detent 1502 will engage detent channel 1504 of arm pad 504. With detent 1502 engaged with detent channel 1504, arm pad 504 is prevented from pivoting in relation to linkage 514. Arm pad 505 and linkage 515 may have a similar locking mechanism 518 as shown in FIG. 15.

Figure 16:
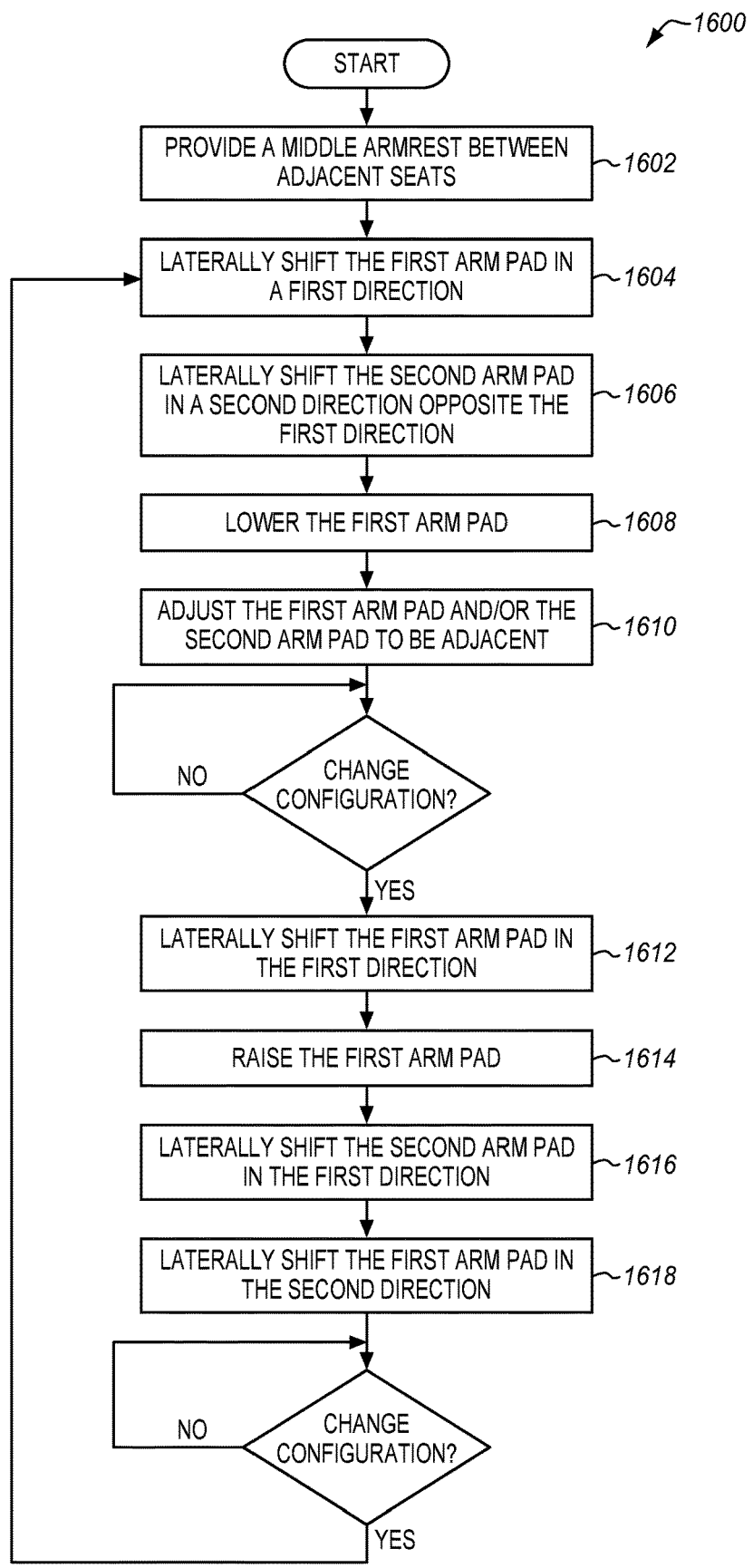
FIG. 16 is a flow chart illustrating a method of converting a middle armrest in an illustrative embodiment.

FIG. 16 is a flow chart illustrating a method 1600 of converting a middle armrest in an illustrative embodiment. The steps of 1600 will be described with respect to middle armrest 311 of FIGS. 5-7, although one skilled in the art will understand that the methods described herein may be performed on other types of armrests. The steps of the method described herein are not all inclusive and may include other steps not shown. The steps for the method may also be performed in an alternative order. FIGS. 17-22 are front views of middle armrest 311 showing the movements of arm pads 504-505 according to method 1600.

To start, a middle armrest 311 is provided between adjacent seats 102 (step 1602). The middle armrest 311 includes arm pads 504-505 in the contracted configuration 530 shown in FIG. 6, with one arm pad 504 disposed on top of the other arm pad 505. Thus, the resting surface 410 of middle armrest 311 has a width 632 defined by the top surface 610 of arm pad 504. In this contracted configuration 530 at the narrower width 632, middle armrest 311 may be considered a "single" armrest. To convert middle armrest 311, arm pad 504 is laterally shifted in one direction (step 1604), and arm pad 505 is laterally shifted in the opposite direction (step 1606). As shown in FIG. 17, arm pad 504 is laterally shifted (i.e., moved to the side or generally transverse to armrest body 502) in a first direction 1701, and arm pad 505 is laterally shifted in a second direction 1702. Arm pad 504 is able to shift laterally in this manner due to a slidable coupling of linkage 514 to arm pad 504, and/or a pivotal coupling of linkage 514 to armrest body 502. Likewise, arm pad 505 is able to shift laterally in this manner due to a slidable coupling of linkage 515 to arm pad 505, and/or a pivotal coupling of linkage 515 to armrest body 502.

In FIG. 16, arm pad 504 is lowered in relation to arm pad 505 toward armrest body 502 (step 1608). As shown in FIG. 18, linkage 514 is able to pivot in relation to armrest body 502, which acts to lower arm pad 504. In FIG. 16, one or both of arm pads 504-505 are adjusted (step 1610) so that arm pad 504 is alongside or adjacent to arm pad 505. As shown in FIG. 19, arm pad 504 may be laterally shifted in the second direction 1702 so that side 612 of arm pad 504 is adjacent side 623 of arm pad 505. Side 612 of arm pad 504 may touch or abut side 623 of arm pad 505, or there may be a small gap separating side 612 of arm pad 504 and side 623 of arm pad 505. The adjustment in step 1610 may also include engaging a detent 1502 of linkage 514 with a detent channel 1504 of arm pad 504 (see FIG. 15), and/or engaging a detent 1502 of linkage 515 with a detent channel 1504 of arm pad 505. After adjustment, middle armrest 311 is converted to the expanded configuration 531. Thus, arm pads 504-505 are disposed side-by-side so that resting surface 410 is defined by a combination of the top surface 610 of arm pad 504 and the top surface 620 of arm pad 505 (see FIG. 7). The resting surface 410 therefore expands from width 632 (see FIG. 6) to a larger width 732 (see FIG. 7). In this expanded configuration 531 having a larger width 732, middle armrest 311 may be considered a "double" armrest. One technical benefit of method 1600 is that middle armrest 311 may have a more narrow profile when in the contracted configuration 530, such as if middle armrest 311 is folded between adjacent seat backs 306, and may have a wider profile when in the expanded configuration 531 to give passengers more of a resting surface 410 to share.

Figure 20:
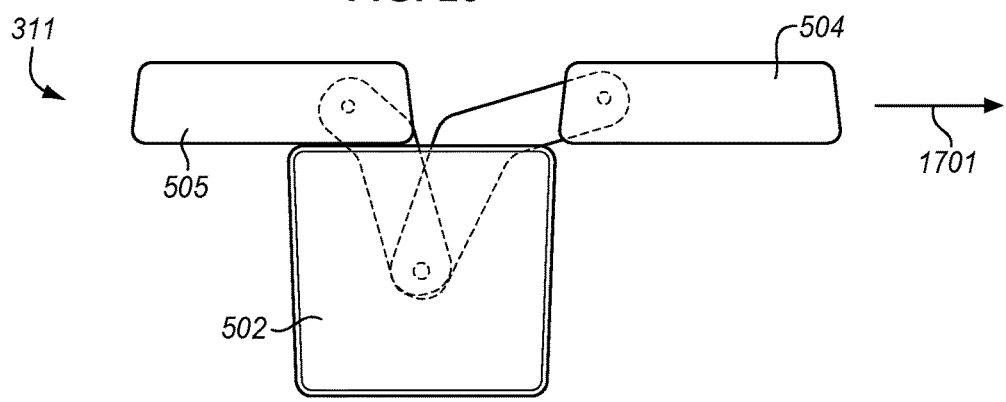
Figure 21:
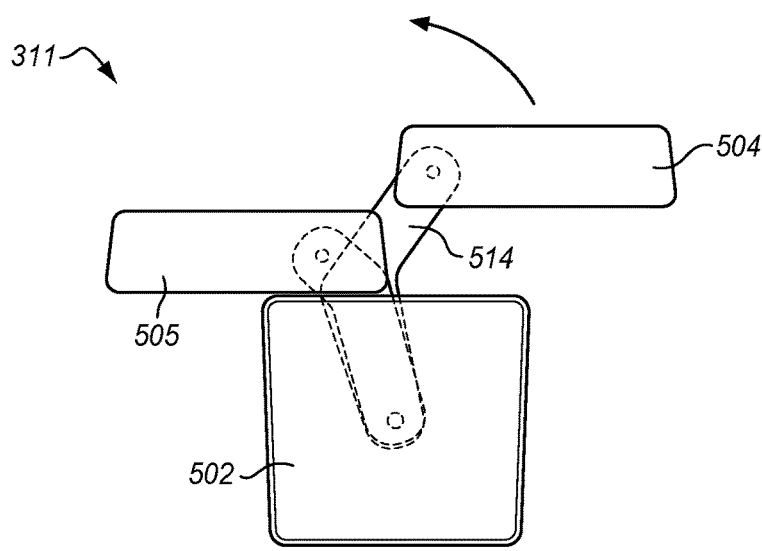
Figure 22:
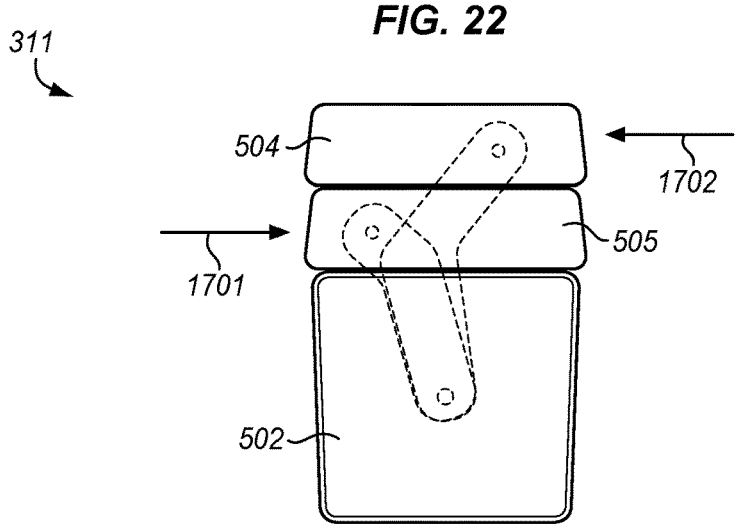

In FIG. 16, to change the configuration back to the contracted configuration 530, arm pad 504 is laterally shifted in the first direction 1701 (step 1612), as shown in FIG. 20. In FIG. 16, arm pad 504 is raised in relation to arm pad 505 away from armrest body 502 (step 1614). As shown in FIG. 21, linkage 514 is able to pivot in relation to armrest body 502, which acts to raise arm pad 504. In FIG. 16, arm pad 505 is laterally shifted in the first direction 1701 (step 1616), and arm pad 504 is laterally shifted in the second direction 1702 (step 1618), as shown in FIG. 22. Middle armrest 311 is therefore converted back to the contracted configuration 530 having the narrower width 632 (see FIG. 6).

Although specific embodiments were described herein, the scope is not limited to those specific embodiments. Rather, the scope is defined by the following claims and any equivalents thereof.

The invention claimed is:
1. A convertible armrest, comprising:
an armrest body connected to a seat frame between adjacent seats;
a first arm pad coupled to the armrest body; and
a second arm pad coupled to the armrest body;

in a contracted configuration, the first arm pad and the second arm pad are stacked so that a resting surface is defined by a top surface of the first arm pad;
in an expanded configuration, the first arm pad and the second arm pad are disposed side-by-side with a side of the first arm pad abutting a side of the second arm pad so that the resting surface is defined by a combination of the top surface of the first arm pad and a top surface of the second arm pad.

2. The convertible armrest of claim 1, further comprising:
a first linkage pivotally coupled to the armrest body, and slidably and pivotally coupled to the first arm pad; and
a second linkage pivotally coupled to the armrest body, and slidably coupled to the second arm pad.

3. The convertible armrest of claim 2, wherein:
the first arm pad has a coupling portion that includes a slot disposed along at least a portion of a width of the first arm pad; and
an end of the first linkage connects to the coupling portion with a retainer disposed through the slot.

4. The convertible armrest of claim 3, further comprising:
a locking mechanism that holds the first arm pad in place in the expanded configuration, the locking mechanism comprising:
a detent that projects from a side of the first linkage; and
a detent channel disposed toward an end of the slot that engages the detent on the first linkage.

5. The convertible armrest of claim 2, wherein:
the second arm pad has a coupling portion that includes a slot disposed along at least a portion of a width of the second arm pad; and
an end of the second linkage connects to the coupling portion with a retainer disposed through the slot.

6. The convertible armrest of claim 1 wherein:
the first arm pad and the second arm pad are disposed equidistant to a vertical centerline of the armrest body in the expanded configuration.

7. The convertible armrest of claim 1 wherein:
the top surface of the first arm pad is co-planar with the top surface of the second arm pad in the expanded configuration.

8. The convertible armrest of claim 1 wherein:
the top surface of the first arm pad is elevated in relation to the top surface of the second arm pad in the expanded configuration, or vice-versa.

9. The convertible armrest of claim 1 wherein:
the armrest body includes a cavity that houses the second arm pad in the contracted configuration.

10. The convertible armrest of claim 1 wherein:
sides of the first arm pad and sides of the second arm pad are beveled.

11. The convertible armrest of claim 1 wherein:
a thickness of the first arm pad is substantially similar to a thickness of the second arm pad.

12. The convertible armrest of claim 1 wherein:
the convertible armrest is installed in a seat assembly of an aircraft.

13. A seat assembly, comprising:
a plurality of seats abreast; and
an intermediate armrest between a pair of the seats that provides a resting surface configured to expand in width;
the intermediate armrest includes a first arm pad and a second arm pad;
in a first configuration, the first arm pad and the second arm pad are stacked so that the resting surface is defined by a top surface of the first arm pad;
in a second configuration, the first arm pad and the second arm pad are disposed side-by-side with a side of the first arm pad abutting a side of the second arm pad so that the resting surface is defined by a combination of the top surface of the first arm pad and a top surface of the second arm pad.

14. The seat assembly of claim 13 wherein the intermediate armrest further includes:
a first linkage pivotally coupled to an armrest body, and slidably and pivotally coupled to the first arm pad; and
a second linkage pivotally coupled to the armrest body, and slidably coupled to the second arm pad.

15. The seat assembly of claim 13 wherein:
the top surface of the first arm pad is co-planar with the top surface of the second arm pad in the second configuration.

16. The seat assembly of claim 13 wherein:
the top surface of the first arm pad is elevated in relation to the top surface of the second arm pad in the second configuration, or vice-versa.

17. The seat assembly of claim 13 wherein:
the intermediate armrest is configured to pivot between seat backs of the pair of the seats; and
a width of the resting surface is constrained by a distance between the seat backs when the intermediate armrest is in the first configuration.

18. The seat assembly of claim 13 wherein:
the seat assembly is installed in an aircraft.

19. A method of converting a middle armrest, the method comprising:
providing the middle armrest between adjacent seats, wherein the middle armrest includes a first arm pad disposed on top of a second arm pad in a contracted configuration so that a resting surface of the middle armrest is defined by a top surface of the first arm pad;
laterally shifting the first arm pad in a first direction;
laterally shifting the second arm pad in a second direction opposite the first direction;
lowering the first arm pad in relation to the second arm pad; and
adjusting at least one of the first arm pad and the second arm pad to be adjacent so that the resting surface of the middle armrest is defined by a combination of the top surface of the first arm pad and a top surface of the second arm pad.

20. The method of claim 19 further comprising:
laterally shifting the first arm pad in the first direction;
raising the first arm pad in relation to the second arm pad;
laterally shifting the second arm pad in the first direction; and
laterally shifting the first arm pad in the second direction to be disposed on top of the second arm pad in the contracted configuration so that the resting surface of the middle armrest is defined by the top surface of the first arm pad.

* * * * *